United States Patent [19]
Grosseau

[11] 3,884,194
[45] May 20, 1975

[54] RECOVERY OF THERMAL ENERGY FROM THE EXHAUST GASES OF AN INTERNAL COMBUSTION ENGINE

[75] Inventor: Albert Grosseau, Chaville, France

[73] Assignee: Societe Anonyme Automobiles Citroen, Paris, France

[22] Filed: Dec. 17, 1973

[21] Appl. No.: 425,223

[30] Foreign Application Priority Data
Dec. 27, 1972 France .............................. 72.47130

[52] U.S. Cl. ..................... 122/7 R; 60/320; 60/321; 165/154
[51] Int. Cl. .............................................. F22b 1/18
[58] Field of Search ............ 122/7; 165/51, 52, 154; 60/320, 321

[56] References Cited
UNITED STATES PATENTS

| | | | |
|---|---|---|---|
| 655,274 | 8/1900 | Ramsden | 122/501 |
| 659,622 | 10/1900 | Mallet et al. | 122/501 |
| 786,781 | 4/1905 | Weimar | 122/501 X |
| 1,837,647 | 12/1931 | Bates | 165/51 |
| 2,047,848 | 7/1936 | Aske, Jr. | 165/51 X |
| 2,979,310 | 4/1961 | Nicholson | 165/154 X |

*Primary Examiner*—Kenneth W. Sprague
*Attorney, Agent, or Firm*—Eyre, Mann & Lucas

[57] ABSTRACT

A steam generator comprises an exhaust pipe connected to receive exhaust gases from an internal combustion engine. A duct, containing water to be heated, is located within the exhaust pipe in heat exchange relationship with the exhaust gases. The exhaust pipe and the duct are each formed from two half-shells having flanges along each edge portion. The half-shells of the exhaust pipe and the duct are connected at common positions.

7 Claims, 2 Drawing Figures

PATENTED MAY 20 1975
3,884,194

RECOVERY OF THERMAL ENERGY FROM THE EXHAUST GASES OF AN INTERNAL COMBUSTION ENGINE

FIELD OF THE INVENTION

The present invention relates to the recovery of thermal energy from the exhaust gases of an internal combustion engine.

SUMMARY OF THE INVENTION

According to the present invention, there is provided a steam generator operated by exhaust gases of an internal combustion engine, said generator comprising, an exhaust pipe arranged to receive exhaust gases from the engine, and a vapourising duct located within the exhaust pipe, said vapourising duct being arranged to receive fluid to be heated, said vapourising duct having a wall which defines a heat exchange surface between the exhaust gases and the fluid, the exhaust pipe and the vapourising duct each being defined by two half-shells, the half-shells of the exhaust pipe, and the half-shells of the vapourising duct having a coincident joint surface, each said half-shell comprising, parallel flanges, said flanges permitting alignment and assembly of the generator by welding.

Further according to the present invention, there is provided in combination, an internal combustion engine, an exhaust pipe connected to receive exhaust gases from the engine, and a heat exchange duct located within the exhaust pipe and connected to receive a fluid to be heated such that fluid with the duct is heated by the exhaust gases passing through the exhaust pipe, the exhaust pipe and the heat exchange duct each being defined by two half-shells, each half shell comprising, a concave wall portion, and a flange at each edge of the wall portion, the flanges of the half-shells defining the heat-exchange duct being interposed between the flanges of the half-shells defining the exhaust pipe.

Preferably, the duct at right angles to the joint surface of the half-shells has a mean thickness which is small compared to its size taken in a direction parallel to the joint surface and in a plane at right angles to the direction of flow of the exhaust gases.

A divided substance, which incorporates open spaces, is preferably provided within the duct for the purpose of "breaking up" the water droplets formed by heating; this substance, can comprise metal shavings or sponge or a fabric or felt of refractory material.

The duct can be in the form of a flattened tube, the flat surfaces are parallel to the surface of the joint.

BRIEF DESCRIPTION OF THE DRAWINGS

An embodiment of the invention will now be described, by way of example only, with reference to the accompanying diagrammatic drawing, in which.

DESCRIPTION OF THE PREFERRED EMBODIMENT

Figure 1:
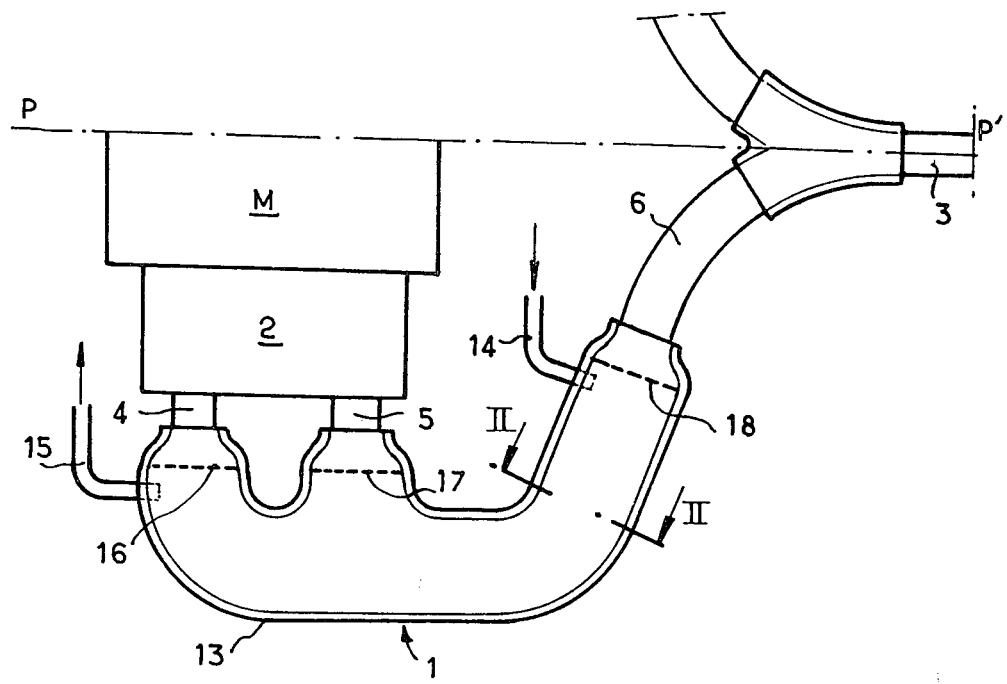
FIG. 1 is a plan view of a steam generator according to the invention.

As shown in FIG. 1, a steam generator 1 is incorporated in the exhaust system of a cylinder-head 2 of an internal combustion engine M having four opposed cylinders. The cylinder head is symmetrical with respect to a vertical plane P-P'. A second steam generator can be incorporated in the same manner in a second exhaust system of the cylinder head located on the other side of the vertical plane P-P' to that shown. The symmetrical exhaust systems merge with each other within an exhaust pipe 3 which is connected to a silencer (not shown).

The casing of the steam generator forms an exhaust pipe 9 between two very short exhaust pipes 4 and 5 each connected to a respective outlet port of the cylinder-head 2, and an exhaust pipe 6 situated immediately upstream of the union with the pipe 3. The casing consists of two half-shells 7, 8 (FIG. 2) stamped from sheet metal and having flanges 7a, 7b and 8a, 8b which are parallel to the joint surface of the half-shells.

There is arranged within the exhaust pipe 9 formed by the half-shells 7, 8, a vapourising duct 10 which consists of two half-shells 11, 12 stamped from sheet metal and having flanges 11a, 11b and 12a, 12b which are parallel to the joint surface. The half-shells 7, 8 and 11, 12 have a common joint surface and are assembled by means of continuous and common welded seams 13.

Figure 2:
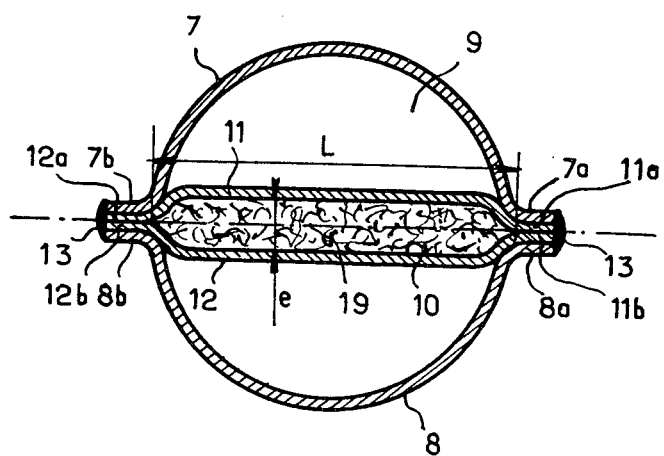
FIG. 2 is a section, to an enlarged scale, taken on line II—II of FIG. 1.

The heat exchange surfaces are parallel to the joint surface depicted by the line S-S' in FIG. 2, and the thickness (e) of the duct at right angles to this joint surface is small compared to the width (L) of the duct.

The end of the vapourising duct which is most distant from the engine M is connected by a pipe 14 to an outlet from a radiator (not shown) and the end of the vapourising duct which is closest to the engine is connected to the inlet of the radiator by a pipe 15. The pipes 14 and 15 pass through the casing of the steam generator at the level of the joint surface, the half-shells having been shaped during stamping for this purpose. The ends of the vapourising duct which extend at right angles to the direction of flow of the exhaust gases are sealed off by means of welded seams 16, 17 and 18.

The vapourising duct 10 contains metal shavings or sponge 19.

The end portions of the generator casing can be connected to the pipes 4, 5 and 6 by welding or other means by which a releasable and gas-tight connection is obtained.

In operation, the liquid which is to be vapourised is fed by the pipe 14 into the vapourising duct at its coolest part, and passes in counterflow with respect to the exhaust gases, in the form of a thin body of liquid. Steam is discharged from the duct at its hottest part through the pipe 15 and is fed towards the radiator.

It will be noted that the steam generator also acts as a coupling element which connects the two exhaust pipes 4, 5 to the single pipe 6.

The steam generator particularly described can be used for heating the passenger compartment of self-propelled vehicles equipped with an air-cooled engine, and can be incorporated in a heating system as described in French Patent Specification No. 71.18957.

The steam generator particularly described has the following advantages:

the vapourising duct has a minimum surface area in contact with the surrounding atmosphere and a maximum heat exchange surface area with the exhaust gases;

the generator can readily be incorporated in a portion of the exhaust system immediately adjacent the cylinder outlets whereby the heat exchange surface can be brought as close as possible to these outlets, and thus to the hottest areas, finally, its production is economical and its bulk small.

What is claimed is:

1. A steam generator operated by exhaust gases of an internal combustion engine, said generator comprising, an exhaust pipe arranged to receive exhaust gases from an internal combustion engine, and a vapourising duct located within the exhaust pipe, said vapourising duct being arranged to receive fluid to be heated, said vapourising duct having a wall which defines a heat exchange surface between the exhaust gases and the fluid, the exhaust pipe and the vapourising duct each being defined by two half-shells, the half-shells of the exhaust pipe, and the half-shells of the vapourising duct having a coincident joint surface, each said half-shell comprising, parallel flanges, said flanges permitting alignment and assembly of the generator by welding, and wherein at right angles to the joint surface of the half-shells, the vapourising duct has a small mean thickness with respect to its size in a direction parallel to the joint surface and in a plane at right angles to the direction of flow of the exhaust gases, and wherein the vapourising duct has the shape of a flattened tube, the flat surfaces of which are parallel to the joint surface and said flat surfaces extending substantially throughout the width of the exhaust pipe.

2. A generator according to claim 1, further comprising, a divided substance contained in the vapourising duct, said divided substance incorporating open spaces.

3. A generator according to claim 2, wherein the divided substance comprises, metal shavings.

4. A generator according to claim 2, wherein the divided substance comprises, metal sponge.

5. A generator according to claim 2, wherein the divided substance comprises, a fabric of refractory material.

6. A generator according to claim 2, wherein the divided substance comprises, a felt of refractory material.

7. A generator according to claim 1, wherein the exhaust pipe further comprises, a manifold having several inflow apertures, each aperture being arranged to communicate with a respective cylinder of an internal combustion engine, said exhaust pipe having at least one outflow aperture.

* * * * *